United States Patent
Suzuki

(10) Patent No.: US 11,660,881 B2
(45) Date of Patent: May 30, 2023

(54) LIQUID DISCHARGING APPARATUS, LIQUID DISCHARGING METHOD AND STORAGE MEDIUM

(71) Applicant: Brother Kogyo Kabushiki Kaisha, Nagoya (JP)

(72) Inventor: Shuhei Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 126 days.

(21) Appl. No.: 17/382,081

(22) Filed: Jul. 21, 2021

(65) Prior Publication Data
US 2022/0024230 A1 Jan. 27, 2022

(30) Foreign Application Priority Data
Jul. 22, 2020 (JP) .............. JP2020-125364

(51) Int. Cl.
*B41J 11/00* (2006.01)
*B41J 2/21* (2006.01)
(52) U.S. Cl.
CPC ....... *B41J 11/00214* (2021.01); *B41J 2/2132* (2013.01); *B41J 11/00218* (2021.01)

(58) Field of Classification Search
CPC .............. B41J 11/00214; B41J 2/2132; B41J 11/00218; B41J 29/393
See application file for complete search history.

(56) References Cited

FOREIGN PATENT DOCUMENTS

| JP | 2013-244655 A | 12/2013 | |
|---|---|---|---|
| JP | 2014040011 A | * 3/2014 | ............... B41J 2/21 |

* cited by examiner

*Primary Examiner* — Justin Seo
(74) *Attorney, Agent, or Firm* — Banner & Witcoff, Ltd.

(57) ABSTRACT

A liquid discharging apparatus includes: a discharging head configured to discharge an ultraviolet cure ink onto a recording medium; and a controller configured to control the discharging head to: discharge the ink onto the recording medium on the basis of a raster data for an image to be formed on the recording medium, the image including a solid image area formed with the raster data at 100% of a printing rate; and execute a gloss reduction printing in which the solid image area is printed on the recording medium by varying the printing rate such that printing rates lower than 100% appear along a printing direction periodically or aperiodically in the course of 100% printing rate.

13 Claims, 7 Drawing Sheets

LIQUID DISCHARGING APPARATUS, LIQUID DISCHARGING METHOD AND STORAGE MEDIUM

CROSS REFERENCE TO RELATED APPLICATIONS

The present application claims priority from Japanese Patent Application No. 2020-125364, filed on Jul. 22, 2020, the disclosure of which is incorporated herein by reference in its entirety.

BACKGROUND

The present invention relates to a liquid discharging apparatus, a liquid discharging method and a storage medium used in, for example, image recording apparatuses such as ink jet printers and the like.

In recent years, there has been known a printing technique for discharging an ultraviolet cure ink onto a recording medium. By irradiating the ink liquid droplets landed on the recording medium with ultraviolet rays, the ink is cured and then fixed on the recording medium. In this manner, if the ultraviolet cure ink is used, then a glossy printed matter is obtainable while it is possible to carry out printing on resin, metal and the like, for example, other than paper.

In the liquid discharging apparatus used in the printing technique described above, images are printed including dot groups where at least two dots are linked to project from the surface of the recording medium. With the at least two corresponding dots being linked, a group with two linked dot is lower in the height from the recording medium than the dots unlinked with other dots (that is, the independent dots). In this manner, according to the liquid discharging apparatus described above, because at least two dots are linked and thus fixed, it is possible to adjust the height of dots projecting from the recording medium, thereby improving the printing quality.

SUMMARY

However, because there is a high surface roughness in the area including the independent dots, the glossiness is weak whereas the glossiness is intensive in the smoothened area including the dot groups. Therefore, if areas including the independent dots are mixed with areas including the groups with linked corresponding dots, then there is a problem that entirely the glossiness is subject to unevenness or variation.

Accordingly, an object of the present disclosure is to provide a liquid discharging apparatus, a liquid discharging method and a storage medium storing a liquid discharging program which are capable of suppressing the unevenness or variation in the glossiness of a recording medium.

According to a first aspect of the present disclosure, there is provided a liquid discharging apparatus including:

a discharging head configured to discharge an ultraviolet cure ink onto a recording medium; and a controller configured to control the discharging head to:

discharge the ink onto the recording medium on the basis of a raster data for an image to be formed on the recording medium, the image including a solid image area formed with the raster data at 100% of a printing rate; and execute a gloss reduction printing in which the solid image area is printed on the recording medium by varying the printing rate such that printing rates lower than 100% appear along a printing direction periodically or aperiodically in the course of 100% printing rate.

According to a second aspect of the present disclosure, there is provided a liquid discharging method including:

discharging an ultraviolet cure ink from a discharging head to a recording medium on the basis of a raster data for an image to be formed on the recording medium, the image including a solid image area formed with the raster data at 100% of a printing rate; and printing on the recording medium the solid image area by varying the printing rate such that printing rates lower than 100% appear along a printing direction periodically or aperiodically in the course of 100% printing rate.

According to a third aspect of the present disclosure, there is provided a non-transitory computer-readable storage medium storing a computer-executable program for a liquid discharging apparatus including: a discharging head configured to discharge an ultraviolet cure ink onto a recording medium; and a controller, the program causing the controller to control the discharging head to:

discharge the ink onto the recording medium on the basis of a raster data for an image to be formed on the recording medium, the image including a solid image area formed with the raster data at 100% of a printing rate; and print on the recording medium the solid image area by varying the printing rate such that printing rates lower than 100% appear along a printing direction periodically or aperiodically in the course of 100% printing rate.

DETAILED DESCRIPTION

Hereinbelow, referring to the accompanied drawings, an explanation will be made on a liquid discharging apparatus and an image recording apparatus including the former according to an embodiment of the present disclosure. The liquid discharging apparatus and the image recording apparatus explained below are merely one embodiment of the present disclosure. Therefore, the present disclosure is not limited to this embodiment but can undergo addition, deletion and/or modification without departing from the true spirit and scope of the present disclosure.

Figure 1:
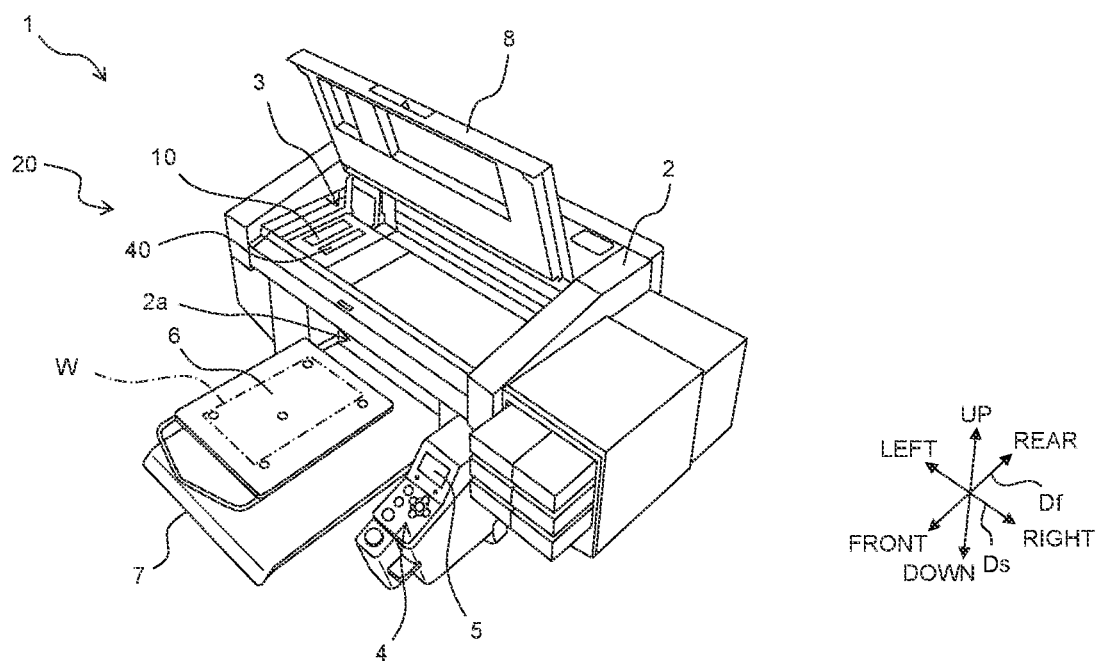
FIG. 1 is a perspective view showing an image recording apparatus including a liquid discharging apparatus.

FIG. 1 is a perspective view showing the image recording apparatus including a liquid discharging apparatus according to the embodiment of the present disclosure. In FIG. 1, mutually orthogonal directions are defined as an up/down direction, a left/right direction (a first direction), and a front/rear direction (a second direction). Note that the left/right direction is a main scanning direction Ds, the front/rear direction is a secondary scanning direction Df. This image recording apparatus 1 not only can carry out printing on a recording medium (a printing object) W such as printing paper or the like, but also can carry out printing on the recording medium W being a non-osmotic medium such as resin, metal, or the like.

Figure 2:
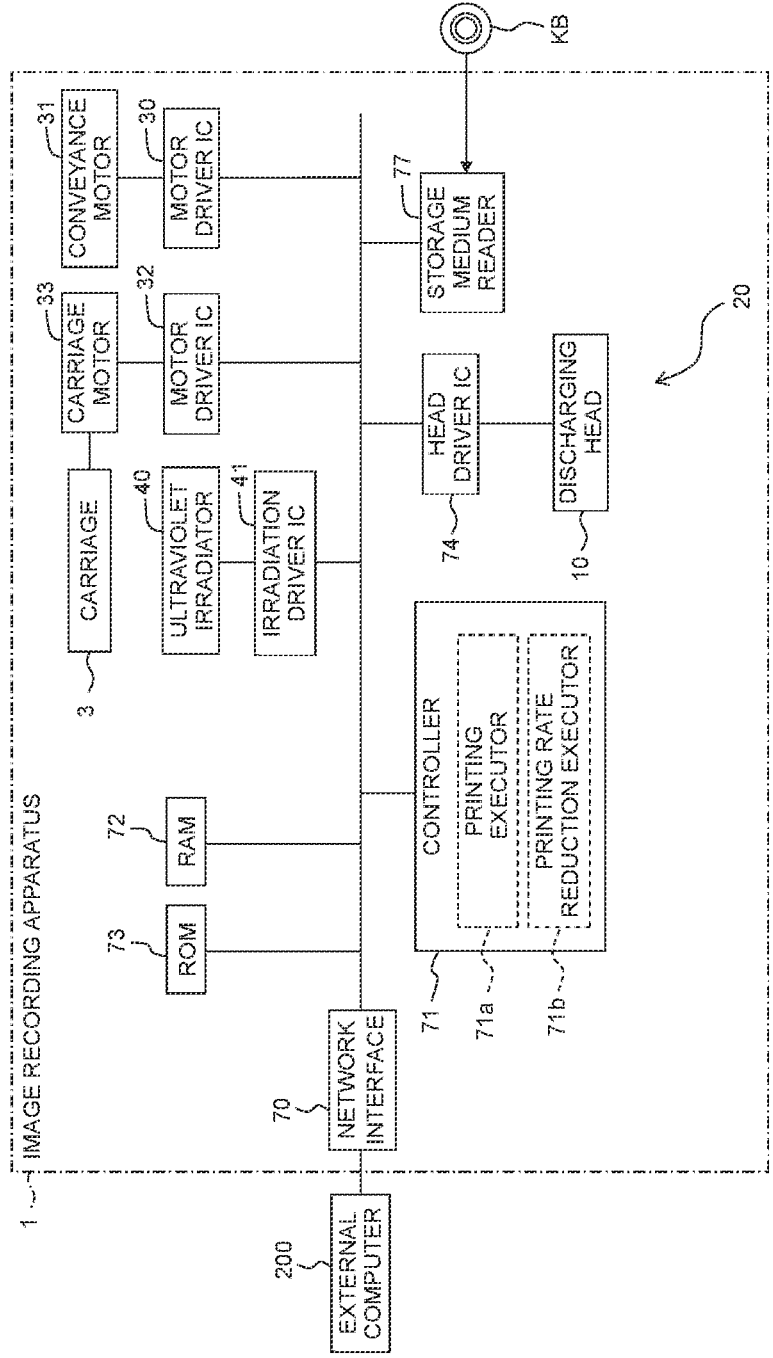
FIG. 2 is a block diagram showing a configuration of the liquid discharging apparatus of FIG. 1.

As shown in FIG. 1, the image recording apparatus 1 of this embodiment includes a casing 2, a carriage 3, operating keys 4, a display 5, a platen 6, a tray 7, an upper cover 8, and a liquid discharging apparatus 20. The liquid discharging apparatus 20 has, for example, a discharging head 10 of serial head type, an ultraviolet irradiator 40, and a control device or controller 71 (FIG. 2). A functional configuration of the controller 71 will be explained later on. Note that instead of the discharging head 10 of serial head type, a discharging head of line head type may be used. Some aspect of using the discharging head of line head type will be described later on.

The casing 2 is formed into a box-like shape, for example. The casing 2 has an opening 2a in the front side and an unshown opening in the rear side. The operating keys 4 are provided in a position at the front right side of the casing 2. Further, the display 5 is provided in a position at the rear side of the operating keys 4. The operating keys 4 accept inputs operated by a user. The display 5 is constructed of a touch panel, for example, to display predetermined information. Part of the display 5 also functions as operating keys on predetermined timing. The controller 71 controls the display of the display 5 while realizing a printing function based on an external input via an input from the operating keys 4 or an aftermentioned network interface 70.

The carriage 3 is configured to be able to reciprocate along the main scanning direction Ds. In this embodiment, the carriage 3 supports the discharging head 10 and the ultraviolet irradiator 40, respectively. As the discharging head 10, an ink jet head is used, for example, to discharge an ultraviolet cure ink onto the recording medium W. In such a discharging head 10, for example four nozzle arrays are provided. Each nozzle array includes a plurality of nozzles arranged to align at certain intervals along the secondary scanning direction Df. The ultraviolet cure ink is to be discharged from the nozzles. The ink discharged from the nozzles of each nozzle array of the discharging head 10 is, for example, either the black (K), or the yellow (Y), magenta (M) and cyan (C) which are collectively referred to as the color ink. Note that the type of ink discharged is not limited to the above but, for example, may be other types such as a clear ink, a white ink, and the like.

Further, the ultraviolet irradiator 40 has a plurality of light emitting diode chips emitting ultraviolet rays, to radiate the ultraviolet rays for curing the ink discharged from the discharging head 10. The light emitting diode chips irradiate the ink with the ultraviolet rays such that a photopolymerization initiator contained in the ink reacts to polymerize the monomer contained in the ink, so as to fix the ink on the recording medium W. The respective light emitting diode chips are arranged, for example, into a matrix formation. In FIG. 1, the discharging head 10 and the ultraviolet irradiator 40 are arranged to align in the main scanning direction Ds. The ultraviolet irradiator 40 is arranged, for example, on the right side of the discharging head 10 in the main scanning direction Ds.

In a printing process, a path (first path) is carried out where the carriage 3 moves leftward from the right side along the main scanning direction Ds. By virtue of this, the discharging head 10 and the ultraviolet irradiator 40 move leftward in the printing process. In the first path, the discharging head 10 moves leftward from the right side in the main scanning direction Ds to discharge the ink onto the recording medium W, while the ultraviolet irradiator 40 moves leftward from the right side in the main scanning direction Ds to irradiate the ink landed on the recording medium W with the ultraviolet rays. In this manner, the ultraviolet irradiator 40 is positioned at the rear side of the discharging head 10 according to the moving direction of the carriage 3 in the printing process (on this occasion, according to the leftward direction from the right side in the main scanning direction Ds). Therefore, it is possible to irradiate the ink with the ultraviolet rays immediately after the ink is landed on the recording medium W.

Further, after the first path is ended in the printing process, such a process as follows may be carried out, for example. If the first path in the printing process is ended, then the carriage 3 moves rightward from the left side along the main scanning direction Ds to return to a predetermined position in the main scanning direction Ds. By virtue of this, the discharging head 10 and the ultraviolet irradiator 40 move rightward in the main scanning direction Ds. On this occasion, the discharging head 10 may move rightward from the left side in the main scanning direction Ds without discharging the ink, while the ultraviolet irradiator 40 may move rightward from the left side in the main scanning direction Ds and irradiate the discharged ink with the ultraviolet rays in the printing process.

The platen 6 is configured to be able to place the recording medium W thereon. The platen 6 has a predetermined thickness and is formed of a rectangular plate, for example, with the secondary scanning direction Df as its longitudinal direction. The platen 6 is supported by an unshown platen supporter which supports the same in a removable manner. The platen supporter is configured to be movable between a printing position where printing is carried out on the recording medium W, and a removal position where the recording medium W is removed from the platen 6. The printing position refers to the position where the platen 6 faces the discharging head 10 whereas the removal position refers to the position where the platen supporter is disposed outside the casing 2 while the recording medium W can be placed on the platen 6. In printing, the platen 6 moves in the secondary scanning direction Df (that is, in a conveyance direction), such that the recording medium W placed on the platen 6 is also conveyed in the conveyance direction.

The tray 7 is provided below the platen 6. The tray 7 has a predetermined thickness and is formed of a rectangular plate, for example, with the secondary scanning direction Df as its longitudinal direction. Further, the upper cover 8 is configured to revolve upward, being supported by its base end configured to allow for the revolution if its front part is raised. By virtue of this, the inside of the casing 2 is exposed.

Next, referring to a block diagram, an explanation will be made on the other configurations of the image recording apparatus 1 including the liquid discharging apparatus 20 of this embodiment.

As shown in FIG. 2, the image recording apparatus 1 of this embodiment includes other components than the above such as: a network interface (I/F) 70, the control device or controller 71 constructed form a CPU and the like, a RAM 72, a ROM 73, a head driver IC 74, a storage medium reader 77, motor driver ICs 30 and 32, a conveyor motor 31, a carriage motor 33, the ultraviolet irradiator 40, and an irradiator driver IC 41. The conveyor motor 31 actuates the platen 6 acting as a conveyor to convey the recording medium W in the conveyance direction (that is, the secondary scanning direction Df) which is orthogonal to the moving direction of the carriage 3 (that is, the main scanning direction Ds). Note that the controller 71 corresponds to a computer function.

The controller 71 has a printing executor 71a and a printing rate reduction executor 71b as its functional components. With the controller 71 executing a predetermined liquid discharging program, the printing executor 71a and the printing rate reduction executor 71b are realized in terms of the functions. Note that the printing executor 71a corresponds to the operation controlling means, while the printing rate reduction executor 71b corresponds to the printing rate reduction executing means.

Based on raster data for discharging liquid droplets of the ink corresponding to the image to be formed on the recording medium W, the printing executor 71a causes the head driver IC 74 to control the operation of the discharging head 10.

Further, the printing rate reduction executor 71b causes the head driver IC 74 to control the operation of the discharging head 10 such that, for the part (the "solid image area" of the present disclosure) where the raster data is formed at 100% of a printing rate (a duty) and included in the image formed on the recording medium W, the discharging head 10 may carry out printing at the printing rate including a printing rate lower than 100% periodically or non-periodically. Note that referring to drawings, a detailed description will be made later on for the process by the printing rate reduction executor 71b.

The RAM 72 temporarily stores print jobs received from a computer 200 such as an external personal computer or the like via the network interface 70. Further, the RAM 72 temporarily stores print data according to each path.

The ROM 73 stores the liquid discharging program of this embodiment and a control program for carrying out various kinds of data processing.

The head driver IC 74 receives an instruction from the controller 71 to control the discharging head 10 for the operation of discharging the ink. In the same manner, the motor driver IC 30 receives an instruction from the controller 71 to control the driving of the conveyor motor 31, while the motor driver IC 32 receives an instruction from the controller 71 to control the driving of the carriage motor 33. Further, the irradiator driver IC 41 receives an instruction from the controller 71 to control the operation for the ultraviolet irradiator 40 to irradiate the ink with the ultraviolet rays.

The storage medium reader 77 is, for example, a device of reading out data (liquid discharging data) related to the liquid discharging program, from a computer readable storage medium KB such as a flexible disk, a CD (CD-ROM, CD-R, CD-RW, or the like), a DVD (DVD-ROM, DVD-RAM, DVD-R, DVD+R, DVD-RW, DVD+RW, or the like), a Blu-ray disk, a magnetic disk, an optical disk, a magnetic optical disk, or the like. The storage medium reader 77 may be a device of reading out the data related to the liquid discharging program, from a storage medium such as a USB flash memory or the like. The liquid discharging data read out are stored in the RAM 72 for the controller 71 to execute.

Note that the liquid discharging data of this embodiment may either be stored in the RAM 72 via the network interface 70 from the external computer 200 or be stored in the RAM 72 after being downloaded from the interne. If the liquid discharging data is stored in the RAM 72 via the network interface 70 from the external computer 200, then for the ink of each color of yellow (Y), magenta (M), cyan (C) and black (K), the external computer 200 preprocesses the same into a data designating that the ink droplets be sized as "large", "medium", "small", and "no discharge".

Hereinbelow, referring to the drawings, an explanation will be made on a method for suppressing the unevenness or variation in glossiness on the recording medium W in this embodiment.

First of all, as described earlier on, this embodiment adopts the discharging head 10 of serial head type. Therefore, in order to avoid white streaks and black streaks arising from a distance error of conveyance of the recording medium W, a so-called singling printing is carried out, that is, a printing method for forming one raster (a linear image along the main scanning direction Ds) by a plurality of main scanning operations (two for example). In the singling printing of such kind, the printing executor 71a causes the discharging head 10 to carry out the printing such that an overlapping part may be formed where an aftermentioned first path p1 and second path p2 overlap, and a non-overlapping part may be formed where the first path p1 and the second path p2 do not overlap. By virtue of this, in the image formed by the first path p1, there is a non-overlapping part not overlapping with the second path p2, and there is an overlapping part overlapping with the second path p2, whereas in the image formed by the second path p2, there is a non-overlapping part not overlapping with the first path p1, and there is an overlapping part overlapping with the first path p1. Then, a synthetic image area is formed of an overlapping part in the first path and the overlapping part in the second path. The details will be described later on.

Figure 3:
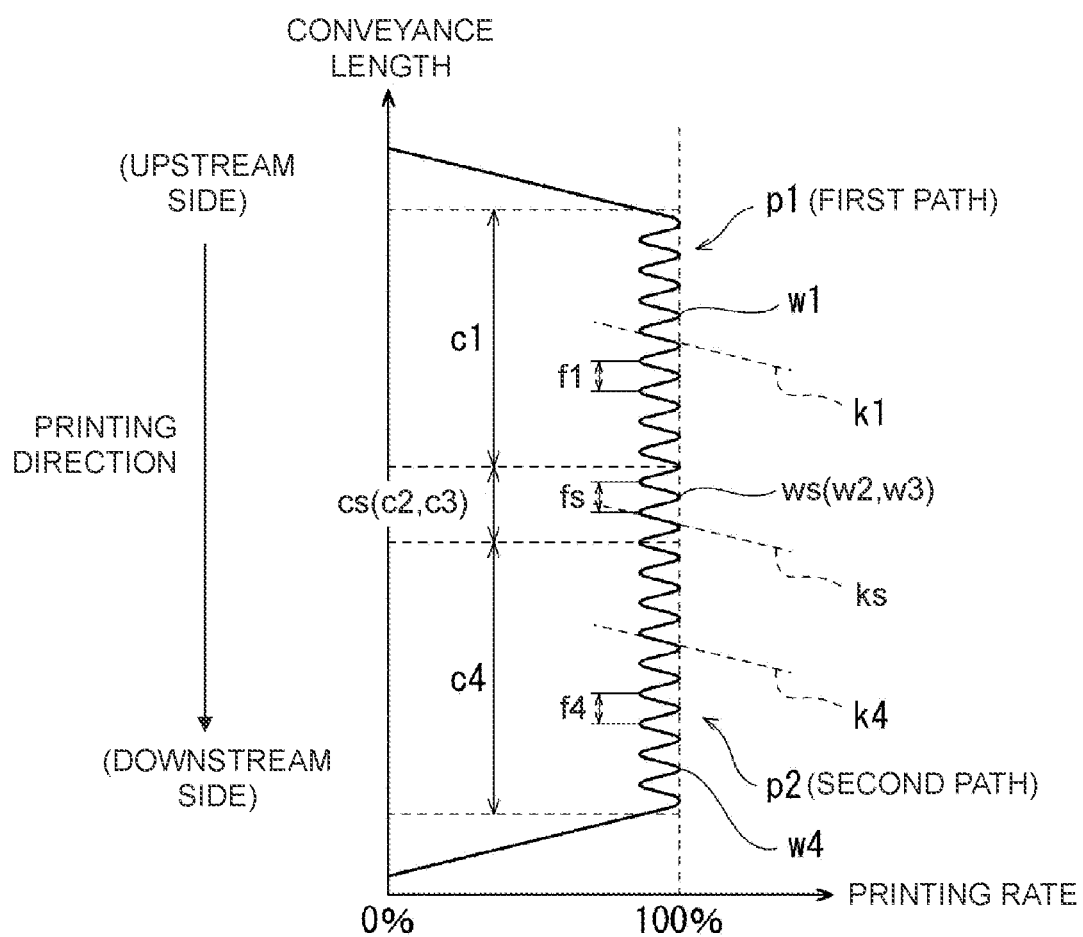
FIG. 3 is a graph showing a change in a printing rate of an image formed on a recording medium by using a discharging head of FIG. 2.

FIG. 3 is a graph showing a change in a printing rate of an image formed on a recording medium. In more detail, the graph of FIG. 3 shows the change in the printing rate of the part (the "solid image area" of the present disclosure) where the raster data is formed at 100% of the printing rate and included in the image formed on the recording medium W. In FIG. 3, a conveyance length (the length in the conveyance direction) is shown on the vertical axis whereas the printing rate (duty) is shown on the horizontal axis.

As shown in FIG. 3, the printing rate reduction executor 71b controls the discharging head 10 to print the solid image area on the recording medium (to be referred to below as gloss reduction printing) by varying the printing rate such that printing rates lower than 100% may appear periodically in the course of 100% printing rate along the conveyance direction (corresponding to the "printing direction" of the present disclosure). The above printing rate including the printing rates lower than 100% periodically includes the periodical 100% printing rate. The printing rate reduction executor 71b applies a mask to an area where "large" is designated as the ink droplet size when the area where "large" is designated as the ink droplet size is equal to or larger than a predetermined area. The mask designates "medium" or "small" as the ink droplet size. Then, the printing rate reduction executor 71b causes the RAM 72 to store a following data as finished with the printing rate reduction. In the data as finished with the printing rate reduction, the "large" ink droplet size is rewritten to the ink droplet size "medium" or "small" in a part overlapping with the mask, and ink droplet size is not rewritten in a part not overlapping with the mask, such that printing rates lower than 100% appear periodically in the course of 100% printing rate along the conveyance direction. Note that the liquid discharging data may be obtained with the controller 71 having converted the colors of the image expressed by RGB stored in an external memory such as a USB or the like into yellow (Y), magenta (M), cyan (C), and black (K). For those data, the ink droplet size is also designated as "large", "medium", "small", or "no discharge".

The discharging head 10 receives a command from the printing rate reduction executor 71b to carry out printing at the printing rate including the printing rates lower than 100% periodically, for either the part where the raster data are formed at the 100% printing rate or the part where the area designated as "large" as the ink droplet size is equal to or larger than the predetermined area in the liquid discharging data described earlier on. In detail, as shown in FIG. 3, the discharging head 10 carries out printing at the printing rate including the printing rates lower than 100% (carries out the gloss reduction printing) periodically for the synthetic image area cs formed of an overlapping part c2 in the first path p1 (overlapping with the second path p2), and an overlapping part c3 in the second path p2 (overlapping with the first path p1). Further, as shown in the same figure, the discharging head 10 also carries out printing at the printing rate including the printing rates lower than 100% (carries out the gloss reduction printing) periodically, respectively for a non-overlapping part c1 in the first path p1, and a non-overlapping part c4 in the second path p2.

In this embodiment, in the synthetic image area cs formed of the overlapping parts c2 and c3, and the non-overlapping parts c1 and c4, it is possible to let the period of varying the printing rate be, for example, 0.5 mm or longer in a printing direction (a direction of the conveyance length in FIG. 3). However, the above period is not limited to 0.5 mm or longer. From the point of view of weakening the glossiness in the synthetic image area cs formed of the overlapping parts c2 and c3 and the non-overlapping parts c1 and c4, the above period of varying the printing rate is desirably not 1.0 mm, that is, desirably less than 1.0 mm. In the present specification, in the solid image area by the gloss reduction printing, the period of varying the printing rate (printing rate period) refers to a length of one cycle of repetition in the printing direction. The period of varying the printing rate may be, for example, a length from the maximum value (100%) of the printing rate to the next maximum value of the printing rate, or a length from the minimum value of the print rate to the next minimum value of the printing rate.

In the first path p1, a period fs of varying the printing rate in the synthetic image area cs formed of the overlapping parts c2 and c3 is the same as a period f1 of varying the printing rate in the non-overlapping part c1. In the same manner, the period fs is the same as a period f4 of varying the printing rate in the non-overlapping part c4. That is, in this embodiment, the period for the synthetic image area cs formed of the overlapping parts is the same as the period for the non-overlapping part in each path.

Further, let an inclination k1 (first inclination) be the inclination of the part (rising part) uprising toward the printing direction (toward the downstream side from the upstream side in the conveyance direction) in a waveform w1 showing the period of varying the printing rate in the printing direction (the period of the printing rate lower than 100%) in the non-overlapping part c1 of the first path p1. Let an inclination ks (second inclination) be the inclination of the part (rising part) uprising toward the printing direction in a waveform showing the period of varying the printing rate in the printing direction for the synthetic image area cs formed of the overlapping part c2 of the first path and the overlapping part c3 of the second path. Let an inclination k4 (third inclination) be the inclination of the part (rising part) uprising toward the printing direction in a waveform w4 showing the period of varying the printing rate in the printing direction for the non-overlapping part c4 of the second path p2. In this case, the inclination k1, the inclination ks, and the inclination k4 are all the same.

Next, an explanation will be made on the overlapping part c2 of the first path p1 and the overlapping part c3 of the second path p2 which constitute the synthetic image area cs. Further, referring to the drawing, an explanation will be made on the details of the waveform w2 showing a change in the printing rate in the overlapping part c2 of the first path p1, and the waveform w3 showing a change in the printing rate in the overlapping part c3 of the second path p2.

Figure 4:
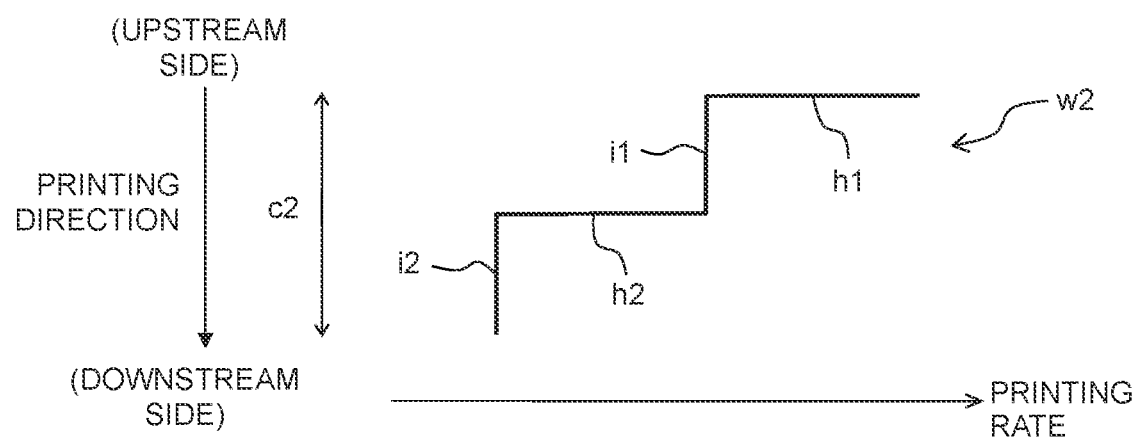
FIG. 4 is a graph showing a waveform presenting a change in the printing rate in an overlapping part c2 of a first path.

As shown in FIG. 4, the waveform w2 in the overlapping part c2 of the first path p1 is, for example, a waveform changing or proceeding in a step-like manner. In detail, the waveform w2 includes a first changing part h1, a second changing part h2, a first constant part i1, and a second constant part i2.

The first changing part h1 and the second changing part h2 of the waveform w2 change in the printing rate in the conveyance direction (the printing direction) with its upper limit value of the printing rate as 100%. The second changing part h2 is located in a different position (in a downstream position) from the first changing part h1 in the conveyance direction. Further, the first constant part i1 is positioned between the first changing part h1 and the second changing part h2, and is constant in terms of the printing rate according to the printing direction. In the same manner, the second constant part i2 is positioned between the second changing part h2 and an unshown changing part, and is constant in terms of the printing rate according to the printing direction.

Figure 5:
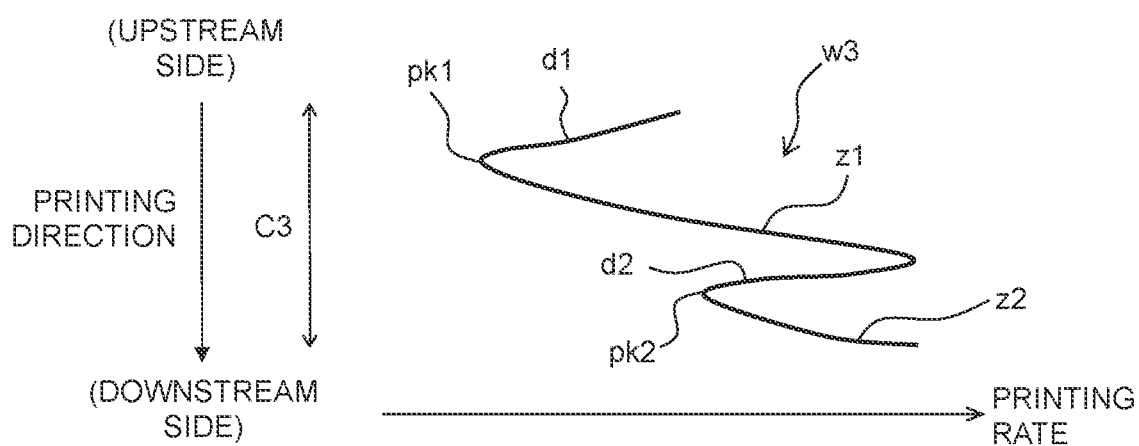
FIG. 5 is a graph showing a waveform presenting a change in the printing rate in an overlapping part c3 of a second path.

Next, as shown in FIG. 5, the waveform w3 in the overlapping part c3 of the second path p1 is, for example, a waveform changing or proceeding in a wave-like manner. In detail, the waveform w3 includes a first ascending part z1, a second ascending part z2, a first descending part d1, and a second descending part d2.

The first ascending part z1 and the second ascending part z2 of the waveform w3 ascend in the printing rate toward the downstream side from the upstream side in the printing direction (conveyance direction), respectively. The second ascending part z2 is located in a different position (in a downstream position in the printing direction) from the first ascending part z1 in the conveyance direction. Further, the first descending part d1 is positioned between the first ascending part z1 and an unshown ascending part to descend in the printing rate toward the downstream side from the upstream side in the printing direction. In the same manner, the second descending part d2 is positioned between the first ascending part z1 and the second ascending part z2 to descend in terms of the printing rate toward the downstream side from the upstream side in the printing direction.

Figure 6:
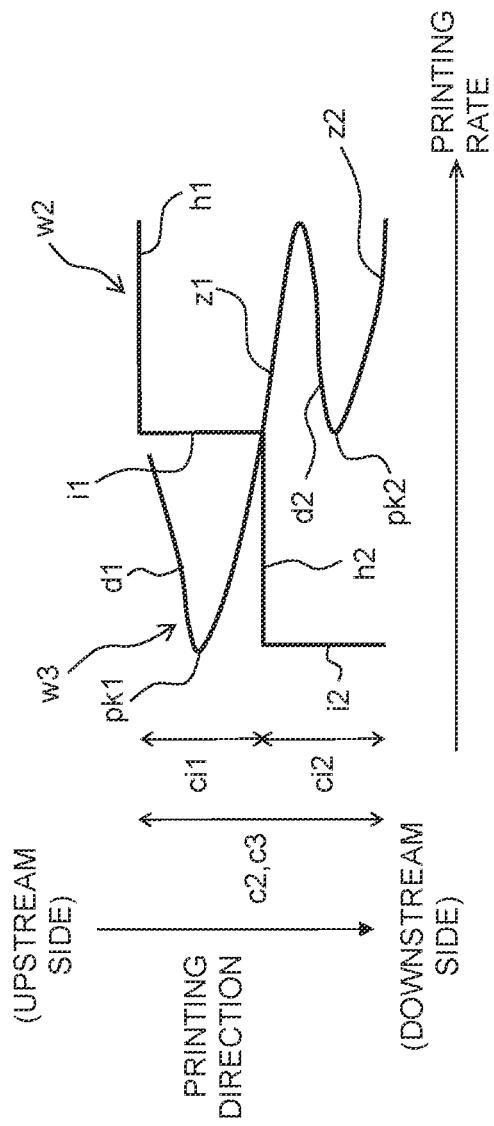
FIG. 6 is a graph for explaining a relation between the waveform for the overlapping part c2 of the first path and the waveform for the overlapping part c3 of the second path.

In the synthetic image area cs, one pair of ascending part and descending part in the waveform w3 is arranged to exist in a printing area where the aforementioned constant part exists in the waveform w2. In particular, as shown in FIG. 6, in a part ci1 where there is the first constant part i1 of the overlapping part c2 of the first path p1, there is one pair of the first descending part d1 and the first ascending part z1. Further, in a part ci2 where there is the second constant part i2 of the overlapping part c2 of the first path p1, there is one pair of the second descending part d2 and the second ascending part z2. In the waveform w2, a printing rate of the first constant part i1 is higher than that of the second constant part i2 (i1>i2). In the waveform w3, a printing rate of a first peak pk1 formed by the first descending part d1 and the first ascending part z1 is lower than that of a second peak pk2 formed by the second descending part d2 and the second ascending part z2 (pk1<pk2). The first peak pk1 is positioned in the part ci1 where there is the first constant part i1. The second peak pk2 is positioned in the part ci2 where there is the second constant part i2.

Next, referring to a flow chart, an explanation will be made on the flow of printing process by the image recording apparatus 1 of this embodiment.

Figure 7:
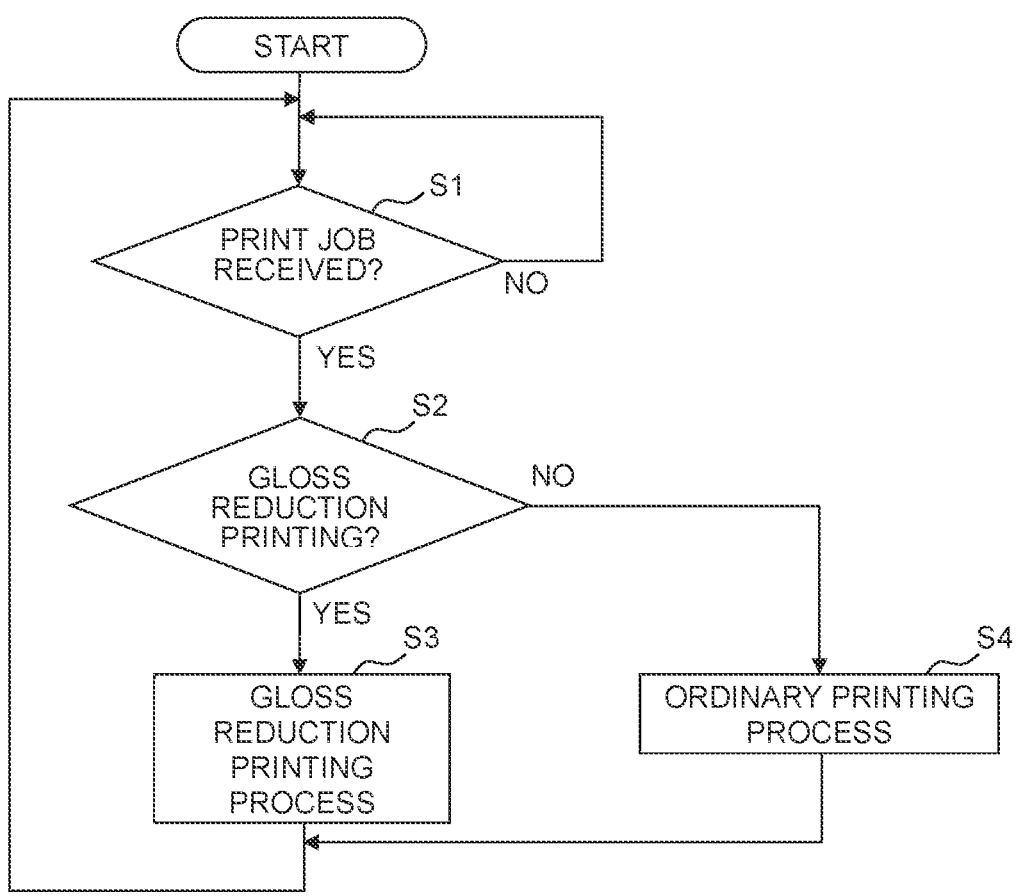
FIG. 7 is a flow chart showing a flow of printing process carried out by the image recording apparatus of FIG. 1.

As shown in FIG. 7, the controller 71 first determines whether or not a print job is received via the network interface 70 (step S1). If no print job is received (step S1: No), then the controller 71 stands by until receiving a print job.

On the other hand, if a print job is received (step S1: Yes), then the controller 71 determines whether or not a flag is turned on for the gloss reduction printing with that print job (step S2). If the flag for the gloss reduction printing is turned on (step S2: Yes), then the controller 71 carries out the aforementioned gloss reduction printing process (step S3). On the other hand, if the flag for the gloss reduction printing is not turned on (step S2: No), then the controller 71 carries out an ordinary printing process (step S4). After the steps S3 and S4, the controller 71 returns the process to the step S1, waiting for the next print job.

In the above manner, according to the liquid discharging apparatus 20 of this embodiment, for the part (a solid image area) where the raster data are formed at the 100% printing rate and included in the image formed on the recording medium, printing (gloss reduction printing) is carried out so that printing rates lower than 100% appear periodically in the course of 100% printing rate along the conveyance direction. By virtue of this, it is possible to suppress the number of linking the corresponding dots, thereby reducing the number of dot groups. Therefore, it is possible to weaken the glossiness in that part. By such a configuration, it is possible to lessen the difference between the glossiness in an area including independent dots and the glossiness in an area including dot groups, compared to the conventional configuration. By virtue of this, it is possible to suppress the variation in glossiness for the entire recording medium. For example, in the case of the recording medium W being a non-osmotic medium, the difference in glossiness is liable to become large because the ink droplets landed earlier are cured in a non-osmotic state such that the ink droplets landed later are made difficult in spreading over the part cured earlier. According to the liquid discharging apparatus 20, it is possible to restrain or prevent the difference in glossiness from becoming large in the case of the recording medium W being a non-osmotic medium.

Further, in this embodiment, if the gloss reduction printing is carried out, then with the 5.0 mm or longer period of the printing rate in the printing direction, it is possible to further weaken the glossiness by further reducing the number of dot groups, and thereby the difference or variation becomes less likely to be distinctive.

Further, in this embodiment, when the singling printing is carried out, in the overlapping part c2 of the first path p1 (the part overlapping with the second path p2), and the overlapping part c3 of the second path p2 (the part overlapping with the first path p1), printing is carried out respectively at the printing rate including the printing rates lower than 100%. Then, the synthetic image area cs formed of the overlapping part c2 of the first path p1 and the overlapping part c3 of the second path p2 is printed on the recording medium by changing or varying the printing rate such that printing rates lower than 100% may appear or be realized periodically or aperiodically in the course of 100% printing rate along the printing direction. By virtue of this, it is possible to weaken the glossiness of the overlapping parts c2 and c3 where the glossiness is more likely to be distinctive in the conventional singling printing, according to this configuration.

Further, in this embodiment, the period fs of varying the printing rate in the synthetic image area cs formed of the overlapping parts c2 and c3 is the same as the period f1 of varying the printing rate in the non-overlapping part c1 of the first path p1. Therefore, it is possible to lessen or eliminate the difference between the glossiness in the synthetic image area cs and the glossiness in the non-overlapping part c1. By virtue of this, it is possible to suppress or prevent the variation between the glossiness in the synthetic image area cs and the glossiness in the non-overlapping part c1.

Further, in this embodiment, the period fs of varying the printing rate in the synthetic image area cs formed of the overlapping parts c2 and c3 is the same as the period f4 of varying the printing rate in the non-overlapping part c4 of the second path p2. Therefore, it is possible to lessen or eliminate the difference between the glossiness in the synthetic image area cs and the glossiness in the non-overlapping part c4. By virtue of this, it is possible to suppress or prevent the variation between the glossiness in the synthetic image area cs and the glossiness in the non-overlapping part c4.

Further, in this embodiment, the inclination k1 in the non-overlapping part c1 of the first path p1, the inclination ks in the synthetic image area cs, and the inclination k4 in the non-overlapping part c4 of the second path p2 are all the same in terms of the property of inclination. Therefore, it is possible to equalize the changes of the respective printing rates in the non-overlapping part c1 of the first path p1, the synthetic image area cs, and the non-overlapping part c4 of the second path p2. By virtue of this, it is possible to equalize the respective differences of glossiness in the non-overlapping part c1 of the first path p1, the synthetic image area cs, and the non-overlapping part c4 of the second path p2.

Further, in this embodiment, the waveform w2 for the overlapping part c2 of the first path p1 has the changing parts h1 and h2 and the constant parts i1 and i2, while the waveform w3 for the overlapping part c3 of the second path p2 has the ascending parts z1 and z2 and the descending parts d1 and d2. That is, by making difference between the shape of the waveform w2 for the overlapping part c2 of the first path p1 and the shape of the waveform w3 for the overlapping part c3 of the second path p2, it is possible to suppress the number of linking the corresponding dots, thereby reducing the number of the dot groups. Therefore, it is possible to weaken the glossiness in the overlapping parts c2 and c3.

Further, as shown in FIG. 6, in this embodiment, the ascending parts z1 and z2 and the descending parts d1 and d2 of the waveform w3 are configured to exist in the printing area where the constant parts i1 and i2 of the waveform w2 exist. By virtue of this, it is possible to suppress the number of linking the corresponding dots, thereby reducing the number of the dot groups, compared to the configuration where the ascending parts z1 and z2 and the descending parts d1 and d2 of the waveform w3 exist in the printing area where the changing parts h1 and h2 of the waveform w2 exist. Therefore, it is possible to weaken the glossiness in the synthetic image area cs (the overlapping parts c2 and c3). That is, in this embodiment, the lower peak (first peak pk1) of the waveform w3 is positioned in the part where there is the higher constant part (in the part ci1 where there is the first constant part i1) of the waveform w2; and the higher peak (second peak pk2) of the waveform w3 is positioned in the part where there is the lower constant part (in the part ci2 where there is the second constant part i2) of the waveform w2. By virtue of this, it is possible to weaken the glossiness in the synthetic image area cs (the overlapping parts c2 and c3).

As described above, in this embodiment, for the parts (the solid image area) where the raster data are formed at the 100% printing rate and included in the image formed on the recording medium, printing (gloss reduction printing) is carried out to periodically realize the printing rate including the printing rates lower than 100% in the conveyance direction (the printing direction) in the course of 100% printing rate. By virtue of this, it is possible to suppress the number of linking the corresponding dots in the conveyance direction, thereby reducing the number of the dot groups. Therefore, it is possible to weaken the glossiness in that part. By virtue of this, it is possible to suppress the variation in glossiness in the conveyance direction.

MODIFIED EMBODIMENTS

The present disclosure is not limited to the above embodiment, but various modifications are applicable thereto without departing from the true spirit and scope of the present disclosure. Examples are shown as follows.

Figure 8A:
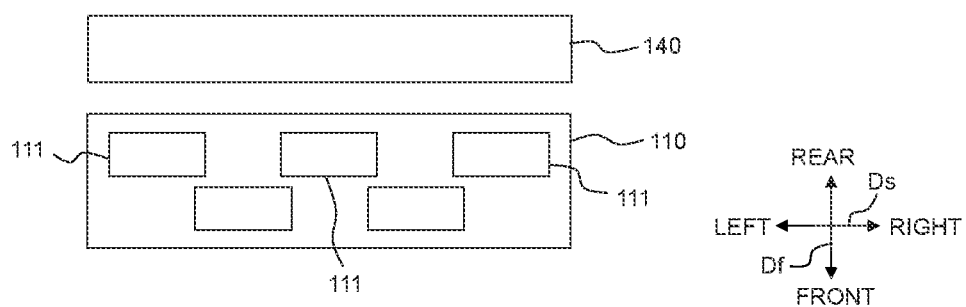
FIG. 8A is a schematic plan view showing a configuration of a discharging head of line head type or method.
Figure 8B:
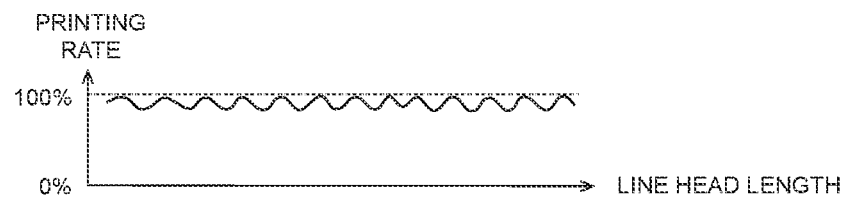
FIG. 8B is a diagram for explaining a change in the printing rate of an image formed on the recording medium by using the discharging head of FIG. 8A.

In the above embodiment, the explanation was made on an aspect of the present disclosure adopting the discharging head 10 of serial head type. However, the discharging head is not limited to that aspect, and a discharging head 110 of line head type may be adopted. The discharging head 110 of line head type is configured to discharge the ink to the recording medium while conveying the recording medium in the conveyance direction. As shown in FIG. 8A, the discharging head 110 of line head type has a plurality of heads 111 arranged to align along the main scanning direction Ds. For example, two heads 111 are arranged at a predetermined interval in the main scanning direction Ds. Three heads 111 are arranged at predetermined intervals in the main scanning direction Ds. The two heads 111 are arranged at the front side according to the secondary scanning direction Df, whereas the three heads 111 are arranged at the rear side according to the secondary scanning direction Df. The position of each frontal head 111 in the main scanning direction Ds is the same as the position of space between the two adjacent heads 111 in the main scanning direction, arranged at the rear side. That is, the respective heads 111 are arranged in a zigzag pattern. Note that the number 140 in FIG. 8A refers to an ultraviolet irradiator. In the aspect of adopting the discharging head 110 of such a line head type, as shown in FIG. 8B, the discharging head 110 carries out printing at a printing rate including printing rates lower than 100% periodically, for the part where the raster data are formed at the 100% printing rate. Note that in the image formed on the recording medium by using the discharging head 110 of the line head type shown in FIG. 8A, the printing rate changes along the main scanning direction Ds as shown in FIG. 8B. That is, the printing direction is the main scanning direction Ds.

Further, in the above embodiment, for the parts where the raster data are formed at the 100% printing rate, the discharging head 10 is configured to carry out printing at the printing rate including the printing rates lower than 100% periodically. However, without being limited to that, for those parts, the discharging head 10 may carry out printing at the printing rate including the printing rates lower than 100% not periodically.

Further, in the above embodiment, the period fs of the synthetic image area cs is the same as the period f1 of the non-overlapping part c1. However, without being limited to that, the period fs may be different from the period f1.

Further, in the above embodiment, in the first path p2, the period fs of the synthetic image area cs is the same as the period f4 of the non-overlapping part c4. However, without being limited to that, the period fs may be different from the period f4.

Further, in the above embodiment, the inclination k1 in the non-overlapping part c1 of the first path p1, the inclination ks in the synthetic image area cs, and the inclination k4 in the non-overlapping part c4 of the second path p2 are all the same. However, without being limited to that, it would suffice to let at least two inclinations be the same among the inclination k1, the inclination ks, and the inclination k4.

Further, in the above embodiment, the period fs of the synthetic image area cs is the same as the period f1 in the non-overlapping part c1 of the first path p1, and the period fs of the synthetic image area cs is the same as the period f4 in the non-overlapping part c4 of the second path p2. However, without being limited to that, the period f1, the period fs, and the period f4 may all be the same. By virtue of this, it is possible to lessen or eliminate the difference in glossiness between the non-overlapping part c1, the synthetic image area cs, and the non-overlapping part c4.

Further, in the above embodiment, the waveform w2 for the overlapping part c2 of the first path p1 has the changing parts h1 and h2 and the constant parts i1 and i2, while the waveform w3 for the overlapping part c3 of the second path p2 has the ascending parts z1 and z2 and the descending parts d1 and d2. However, without being limited to that, the waveform w2 for the overlapping part c2 of the first path p1 may have the ascending parts and the descending parts, while the waveform w3 for the overlapping part c3 of the second path p2 may have the changing parts and the constant parts.

Further, in the above embodiment, the waveform w1 for the non-overlapping part c1 of the first path p1, the waveform w2 for the overlapping part c2 of the first path p1, the waveform w3 for the overlapping part c3 of the second path p2, and the waveform w4 for the non-overlapping part c4 of the second path p2 have the same lower limit value of the respective printing rates. However, without being limited to that, for example, the lower limit value of the printing rate of the waveform w2 for the overlapping part c2 of the first path p1 and the lower limit value of the printing rate of the waveform w3 for the overlapping part c3 of the second path p2 may be smaller than the lower limit value of the waveform w1 for the non-overlapping part c1 of the first path p1 and the lower limit value of and the waveform w4 for the non-overlapping part c4 of the second path p2. By virtue of this, it is possible to further weaken the glossiness of the overlapping parts c2 and c3.

What is claimed is:

1. A liquid discharging apparatus comprising:
   a discharging head configured to discharge an ultraviolet cure ink onto a recording medium; and
   a controller configured to control the discharging head to:
   discharge the ink onto the recording medium on the basis of a raster data for an image to be formed on the recording medium, the image including a solid image area formed with the raster data at 100% of a printing rate; and execute a gloss reduction printing in which the solid image area is printed on the recording medium by varying the printing rate such that printing rates lower than 100% appear along a printing direction periodically or aperiodically in the course of 100% printing rate.

2. The liquid discharging apparatus according to claim 1, wherein in the gloss reduction printing, the solid image area is printed on the recording medium by varying the printing rate such that the printing rates lower than 100% appear along the printing direction periodically in the course of 100% printing rate.

3. The liquid discharging apparatus according to claim 2, wherein in the gloss reduction printing, a period of varying the printing rate in the printing direction is 0.5 mm or longer.

4. The liquid discharging apparatus according to claim 2, further comprising a carriage configured to support the discharging head and configured to reciprocate in a first direction,
wherein the controller is configured to control the discharging head and the carriage to:
move the carriage in the first direction while discharging the ink from the discharging head in a first path and a second path which is carried out next to the first path;
print the solid image area on the recording medium by the first path and the second path, an image formed by the first path having an overlapping part overlapping with the second path and a non-overlapping part not overlapping with the second path, and an image formed by the second path having an overlapping part overlapping with the first path and a non-overlapping part not overlapping with the first path; and
execute the gloss reduction printing in a synthetic image area formed of the overlapping part of the first path and the overlapping part of the second path.

5. The liquid discharging apparatus according to claim 4, wherein the controller is configured to control the discharging head and the carriage to execute the gloss reduction printing in the non-overlapping part of the first path, and
a period of varying the printing rate in the printing direction in the synthetic image area is the same as a period of varying the printing rate in the printing direction in the non-overlapping part of the first path.

6. The liquid discharging apparatus according to claim 4, wherein the controller is configured to control the discharging head and the carriage to execute the gloss reduction printing in the non-overlapping part of the second path, and
a period of varying the printing rate in the printing direction in the synthetic image area is the same as a period of varying the printing rate in the printing direction in the non-overlapping part of the second path.

7. The liquid discharging apparatus according to claim 4, wherein the controller is configured to control the discharging head and the carriage to execute the gloss reduction printing in the non-overlapping part of the first path and in the non-overlapping part of the second path;
a first inclination is an inclination of a rising part uprising toward the printing direction, in a waveform showing a period of varying the printing rate in the printing direction in the non-overlapping part of the first path;
a second inclination is an inclination of a rising part uprising toward the printing direction, in a waveform showing a period of varying the printing rate in the printing direction in the synthetic image area;
a third inclination is an inclination of a rising part uprising toward the printing direction, in a waveform showing a period of varying the printing rate in the printing direction in the non-overlapping part of the second path; and
the first inclination, the second inclination, and the third inclination are all the same.

8. The liquid discharging apparatus according to claim 4, wherein
a waveform showing a change of the printing rate in the printing direction in the overlapping part of the first path has a first changing part, a second changing part, and a constant part positioned between the first changing part and the second changing part, wherein each of printing rates in the first changing part and the second changing part changes in the printing direction, and a printing rate in the constant part is constant in the printing direction; and
a waveform showing a change of the printing rate in the printing direction in the overlapping part of the second path has an ascending part and a descending part, wherein a printing rate in the ascending part ascends toward the downstream side from the upstream side in the printing direction, and a printing rate in the descending part descends toward the downstream side from the upstream side in the printing direction.

9. The liquid discharging apparatus according to claim 8, wherein the ascending part and the descending part in the second path exist in a printing area where the constant part in the first path exists.

10. The liquid discharging apparatus according to claim 4, further comprising a conveyor configured to convey the recording medium in a second direction intersecting with the first direction, wherein the printing direction is the second direction.

11. The liquid discharging apparatus according to claim 1, wherein the discharging head is included in a plurality of discharging heads forming a line head, the plurality of discharging heads being arranged in the printing direction,
the liquid discharging apparatus further comprises a conveyor configured to convey the recording medium in a conveying direction intersecting with the printing direction, and
the controller is configured to control the discharging head and the conveyor to discharge the ink from the discharging head while conveying the recording medium in the conveying direction.

12. A liquid discharging method comprising:
discharging an ultraviolet cure ink from a discharging head to a recording medium on the basis of a raster data for an image to be formed on the recording medium, the image including a solid image area formed with the raster data at 100% of a printing rate; and
printing on the recording medium the solid image area by varying the printing rate such that printing rates lower than 100% appear along a printing direction periodically or aperiodically in the course of 100% printing rate.

13. A non-transitory computer-readable storage medium storing a computer-executable program for a liquid discharging apparatus including: a discharging head configured to discharge an ultraviolet cure ink onto a recording medium; and a controller, the program causing the controller to control the discharging head to:

discharge the ink onto the recording medium on the basis of a raster data for an image to be formed on the recording medium, the image including a solid image area formed with the raster data at 100% of a printing rate; and print on the recording medium the solid image area by varying the printing rate such that printing rates lower than 100% appear along a printing direction periodically or aperiodically in the course of 100% printing rate.

* * * * *